United States Patent
Son et al.

(10) Patent No.: US 10,659,167 B1
(45) Date of Patent: May 19, 2020

(54) ACTIVE OPTICAL CABLE

(71) Applicant: OPTOMIND INC., Suwon-si (KR)

(72) Inventors: Yung Sung Son, Suwon (KR); Taeyong Kim, Suwon (KR); Yong Sung Jin, Seoul (KR); Yong Geon Lee, Seoul (KR)

(73) Assignee: OPTOMIND INC. (KR)

(*) Notice: Subject to any disclaimer, the term of this patent is extended or adjusted under 35 U.S.C. 154(b) by 0 days.

(21) Appl. No.: 16/288,759

(22) Filed: Feb. 28, 2019

(30) Foreign Application Priority Data

Dec. 14, 2018 (KR) .................. 10-2018-0162261
Feb. 20, 2019 (KR) .................. 10-2019-0019657

(51) Int. Cl.
*H04B 10/40* (2013.01)
*H04B 10/564* (2013.01)
*H04L 25/49* (2006.01)
*G02B 6/42* (2006.01)
*G02B 6/43* (2006.01)
*H04B 10/25* (2013.01)

(52) U.S. Cl.
CPC .......... *H04B 10/40* (2013.01); *G02B 6/4214* (2013.01); *G02B 6/43* (2013.01); *H04B 10/2503* (2013.01); *H04B 10/564* (2013.01); *H04L 25/4917* (2013.01)

(58) Field of Classification Search
CPC ................ H04B 10/40; H04B 10/50–588
See application file for complete search history.

(56) References Cited

U.S. PATENT DOCUMENTS

| 10,416,398 B2 | 9/2019 | Son et al. | |
| 2004/0013431 A1* | 1/2004 | Vail | H01S 5/40 398/84 |
| 2005/0078916 A1* | 4/2005 | Hosking | H04B 10/40 385/88 |

(Continued)

FOREIGN PATENT DOCUMENTS

| JP | 2015-159415 A | 9/2015 |
| KR | 10-2011-0097895 A | 8/2011 |

(Continued)

OTHER PUBLICATIONS

U.S. Appl. No. 16/285,841, filed Feb. 26, 2019, Son, Yung-Sung, et al.

(Continued)

*Primary Examiner* — Nathan M Cors
(74) *Attorney, Agent, or Firm* — Harness, Dickey & Pierce, P.L.C.

(57) ABSTRACT

An active optical cable is disclosed. According to the present disclosure, there is provided an active optical cable, characterized by: having no complicated structure by obviating the need for a separate monitoring photodetector as was used for a typical optical transceiver, increasing light output-current linearity to improve optical coupling efficiency, generating a library of transmission/reception-related electro-optical characteristics of both optical modules so as to enable light outputted from a light source included in an optical transmitter to maintain high linearity over a wide range of temperatures, thereby reducing power consumption, and being applicable to a multi-level PAM technique involving at least four (4) levels.

11 Claims, 8 Drawing Sheets

(56) References Cited

U.S. PATENT DOCUMENTS

| | | | |
|---|---|---|---|
| 2010/0158515 A1 | 6/2010 | Watanabe et al. | |
| 2011/0255876 A1* | 10/2011 | Sugihara | H04B 10/5053 |
| | | | 398/188 |
| 2015/0071651 A1* | 3/2015 | Asmanis | H04B 10/524 |
| | | | 398/141 |
| 2018/0299630 A1 | 10/2018 | Son et al. | |
| 2018/0306985 A1 | 10/2018 | Son et al. | |

FOREIGN PATENT DOCUMENTS

| | | |
|---|---|---|
| KR | 10-2012-0133159 A | 12/2012 |
| KR | 10-1858029 B1 | 5/2018 |

OTHER PUBLICATIONS

U.S. Appl. No. 16/330,396, filed Mar. 5, 2019, Son, Yung-Sung Son.

* cited by examiner (a)

| Type | Channel | 1st Input Current | 1st Output Current | 1st Ref. Optical Output | 1st Input Current Comp. | Rx Comp. Optical Output | 25°c TX Comp. Current | 50°c TX Comp. Current | 60°c TX Comp. Current | 70°c TX Comp. Current | ... |
|---|---|---|---|---|---|---|---|---|---|---|---|
| AOC1 | 1 | 3 mA | 100 μm | 100% | 3 mA | 100% | 3 mA | 3.9 mA | 4.2 mA | 4.5 mA | |
| AOC1 | 2 | 3 mA | 70 μm | 70% | 4 mA | 100% | 4 mA | 5.2 mA | 5.6 mA | 6 mA | |
| AOC1 | 3 | 3 mA | 50 μm | 50% | 5 mA | 100% | 5 mA | 6.5 mA | 7 mA | 7.5 mA | |
| AOC1 | 4 | 3 mA | 60 μm | 60% | 4.5 mA | 100% | 4.5 mA | 4.85 mA | 5.3 mA | 6.75 mA | |

| AOC2 | 2 | 3mA | 110 μm | 110% | 2.7 mA | 100% | 2.7 mA | 3.51 mA | 3.78 mA | 4.05 mA | ... |

ACTIVE OPTICAL CABLE

CROSS-REFERENCE TO RELATED APPLICATIONS

The present application is based on, and claims priority from Korean Patent Application No. 10-2019-0019657 filed on Feb. 20, 2019, and Korean Patent Application No. 10-2018-0162261 filed on Dec. 14, 2018, the disclosures of which are incorporated by reference herein in their entireties.

TECHNICAL FIELD

The present disclosure in some embodiments relates to an active optical cable (AOC).

BACKGROUND

The statements in this section merely provide background information related to the present disclosure and do not necessarily constitute prior art.

In recent years, in order to provide service using a novel relay platform such as social networking service (SNS), one-person media, etc. in a high performance mobile device, there is a need for a greater bandwidth than conventional art.

For instance, Cisco Visual Networking Index 2018 has presumed that the number of network connection devices per person would increase more than 3.6 times according to the development of Internet of Things (IoT), 5G mobile communication network technology, etc. Further, internet data usage per month per person was presumed to reach 85 GB in 2022. It also expected that video contents occupying 70% of total data traffic in 2017 will increase to more than 80% in 2022.

When classified by destination, explosively increasing data traffic may go to the inside of data centers, between data centers, and between the data center and the user. 70% or more of the global data traffic is generated in the data center. Data generated worldwide are mostly based on activities such as production, processing, storage, authentication of data generated in the data center.

Optical interconnect solutions can tackle the current explosive increase in data traffic inside the data center. The optical interconnect solutions have already replaced copper based interconnect networks in long-haul and metropolitan communication networks. The optical interconnect solutions have gradually broadened their application with increase in bandwidth and the advancement of optical communication technology. Of such optical interconnect solutions, an optical transceiver is representative of long distance optical interconnect solutions.

From a viewpoint of the user, a typical optical transceiver has both electrical and optical interfaces. Interconnecting two physically separate points using the typical optical transceiver needs two optical transceivers and a patch cord for the generation of optical interconnect between these two optical transceivers. Both of the optical transceivers generally used in the art need to be designed and manufactured to meet with electro-optical characteristics of optical signals received and transmitted ('transceived') by the optical transceivers, respectively. In order to make sure the optical transceivers working properly, the user is supposed to carefully select a pair of optical transceivers. After installing one optical transceiver at one side, the user needs to select the other optical transceiver which suitably matches with the previously selected optical transceiver, and then, install the other optical transceiver at the other side.

Optical signals transmitted from one of the optical transceivers to the other need to be monitored in real time. Further, the strength of optical signals transmitted from a transmitter needs to be increased or decreased according to a condition of an optical link.

When adjusting the strength of optical signals according to the condition of the optical link, a monitoring photodetector (MPD) may be arranged near a light source of the transmitter and used. The MPD monitors the optical signals outputted from the light source in real time. Similar to a structure of the aforementioned optical transceiver, multi-level pulse amplitude modulation or PAM-N(N is a natural number of more than 2) technique-based optical transceivers still need to employ the MPD.

For instance, when employing a PAM-4 technique which utilizes the entire strength of signal by four levels, the strength of optical signals transmitted from a transmitter needs to be monitored and controlled in real time so as to assure a desired level of extinction ratio (ER) of the optical signals transmitted from the optical transceiver. Typically, this task is also governed by the use of MPD.

In order to perform real-time monitoring and control of the optical signals outputted from an optical transceiver, a typical optical transceiver needs an MPD at a position near an internal light source of the optical transceiver and further requires an optical system that allows to input a part of the optical signal emitted from the light source to the MPD.

Further, when the light source is a vertical emitting type laser rather than an edge-emitting type or in-plane type laser, it is even more difficult to implement optical coupling between the light source and the MPD. In other words, high volume production of optical transceivers based on vertical emitting type lasers are even harder, compared to optical transceivers based on edge-emitting type lasers.

Figure 1:
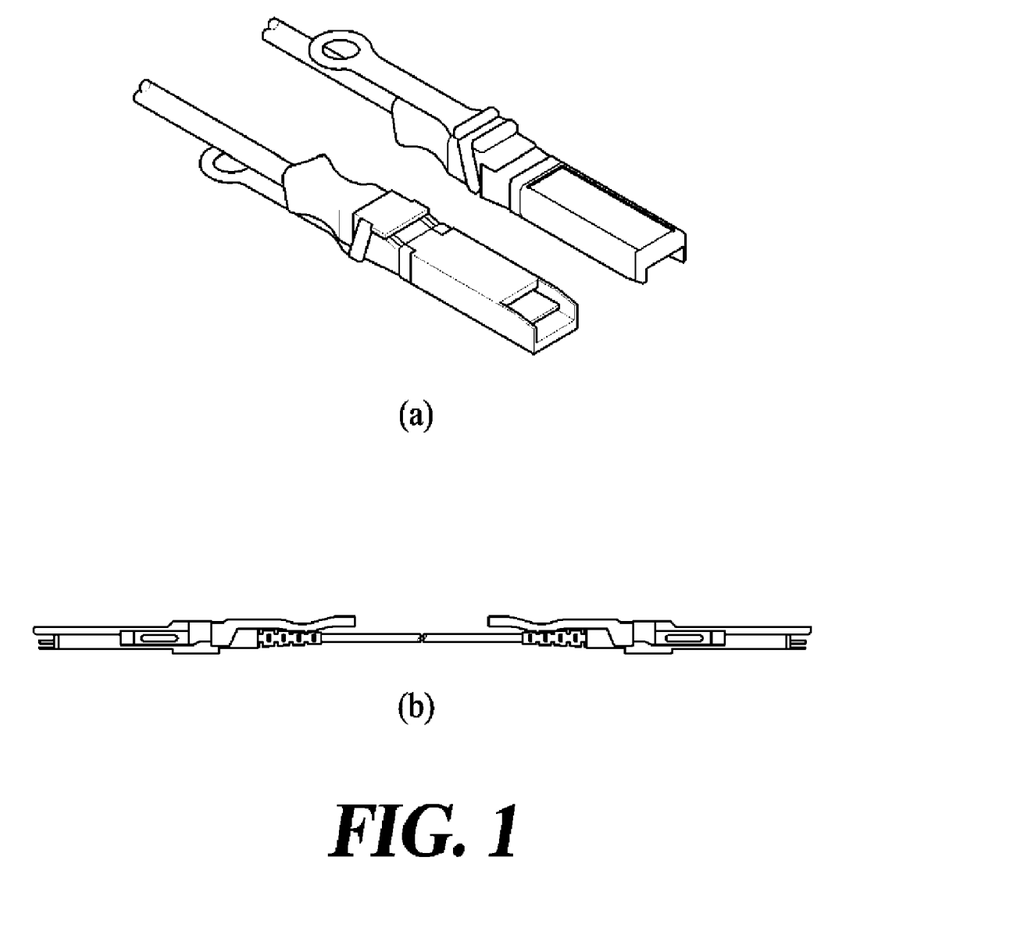
FIG. 1 is a schematic diagram of a typical AOC.

A small form factor pluggable (SFP) type of AOC shown in FIG. 1 at (a), or a quad small form factor pluggable (QSFP) type of AOC shown in FIG. 1 at (b), each of which has a structure similar to the optical transceiver, includes an electrical interface only. Optical transceiver modules at both ends of the SPF AOC or the QSFP AOC need no constant monitoring of the optical output of the light source or other factors, because they go through complete testing and setup of optical components and electronic components during manufacturing. Therefore, an AOC having such a structure as described above can be easily installed and maintained while having substantially the same performance and functions as the optical transceiver.

Accordingly, there is a need for an optical module that takes advantages of the AOC described above and requires no MPD, and is capable of increasing light output-current linearity to thus improve optical coupling efficiency without any specific component involving a complicated structure and high cost.

SUMMARY

In accordance with some embodiments, the present disclosure seeks to provide an active optical cable (AOC), characterized by: having no complicated structure by obviating the need for a separate monitoring photodetector as was used for a typical optical transceiver, increasing light output-current linearity to improve optical coupling efficiency, generating a library of transmission/reception-related electro-optical characteristics of both optical modules so as to enable optical output from a light source included in an optical transmitter to maintain high linearity over a broad range of temperatures, thereby reducing power consumption, and being applicable to a multi-level PAM technique involving at least four (4) levels.

According to an aspect of the present disclosure, an AOC includes an optical link, a first transmission-reception module and a second transmission-reception module. The optical link is configured to include a first end and a second end, and to transfer optical signals between the first end and the second end bilaterally. The first transmission-reception module is configured to either convert a first electrical signal input from a first host unit to a first optical signal and then transmit the first optical signal from the first end to the second end, or covert a second optical signal received from the second end to a second electrical signal and then output the second electrical signal to the first host unit, and to concurrently control a strength of the first optical signal in accordance with electro-optical characteristics and a temperature which are stored in advance. The second transmission-reception module is configured to either convert a third electrical signal input from a second host unit to a third optical signal and then transmit the third optical signal from the second end to the first end, or convert a fourth optical signal received from the second end to a fourth electrical signal and then output the fourth electrical signal to the second host unit, and to concurrently control a strength of the third optical signal in accordance with electro-optical characteristics and a temperature which are stored in advance.

As described above, according to the present disclosure, since any alternative monitoring photodetector applied to a conventional optical transceiver is not required, light output-current linearity can be increased to thus improve optical coupling efficiency without a complicated structure. Further, a library of transmission/reception-related electro-optical characteristics at both modules may be generated to enable optical output from a light source in the optical transmitter to maintain high linearity in a wide range of temperature, thereby attaining effects of reducing power consumption.

According to the present disclosure, even without a monitoring photodetector (MPD) in a transmission unit, the transmission unit can be controlled based on a correlation in regard to electro-optical characteristics and temperature between the transmission unit and the reception unit, which are stored in a lookup or reference table, thereby attaining effects of uniformly maintaining the strength of optical signals output from the transmission unit.

According to another aspect of the present disclosure, an exact drive current can be applied to the light source, thereby providing different types of optical transceiver devices that require a light source with high-linearity light output-current (L-I) characteristics.

DETAILED DESCRIPTION

Exemplary embodiments of the present disclosure are described below with reference to the accompanying drawings.

Figure 2:
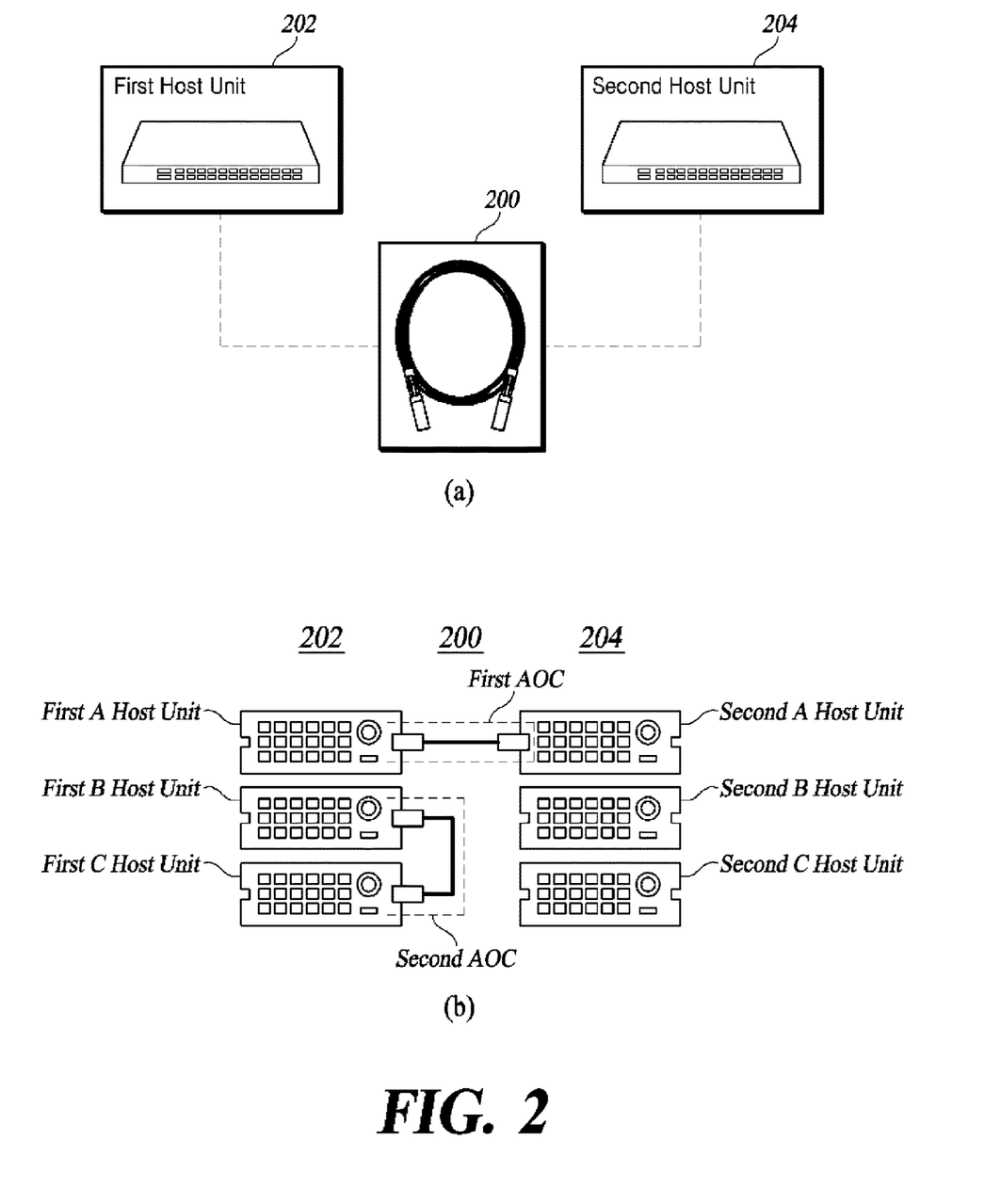
FIG. 2 is a diagram of illustrative applications of an AOC according to at least one embodiment of the present disclosure.

FIG. 2 is a diagram of illustrative applications of an AOC according to at least one embodiment of the present disclosure.

An AOC 200 according to at least one embodiment of the present disclosure includes two optical modules and an optical link for interconnecting these two optical modules, however, components included in the AOC 200 are not particularly limited to the aforementioned components.

Referring to FIG. 2 at (a), the AOC 200 according to at least one embodiment interconnects between first host units 202 and second host units 204 in order to transfer data from the first host units 202 to the second host units 204, as well as data from the second host units 204 to the first host units 202. Each of the first host units 202 and the second host units 204 may be one selected from among network devices that serve as one of a server, switch and storage.

Referring to FIG. at (b), the AOC 200 according to at least one embodiment may be arranged as a first AOC that connects the first host units 202 and the second host units 204, or as a second AOC that interconnects two host units selected from a first A host unit, a first B host unit and a first C host unit which are included in the first host units 202. Alternatively, the AOC 200 may be arranged to interconnect between a second A host unit, a second B host unit and a second C host unit which are included in the second host units 204. Further, the AOC 200 may be an optical cable formed to connect from a single host unit to multiple host units. Individual host units included in the first host units 202 and in the second host units 204, that is, each of the first A host unit, the first B host unit, the first C host unit, the second A host unit, the second B host unit and the second C host unit may be one of network devices that serve as one of a switch, server and storage.

Figure 3:
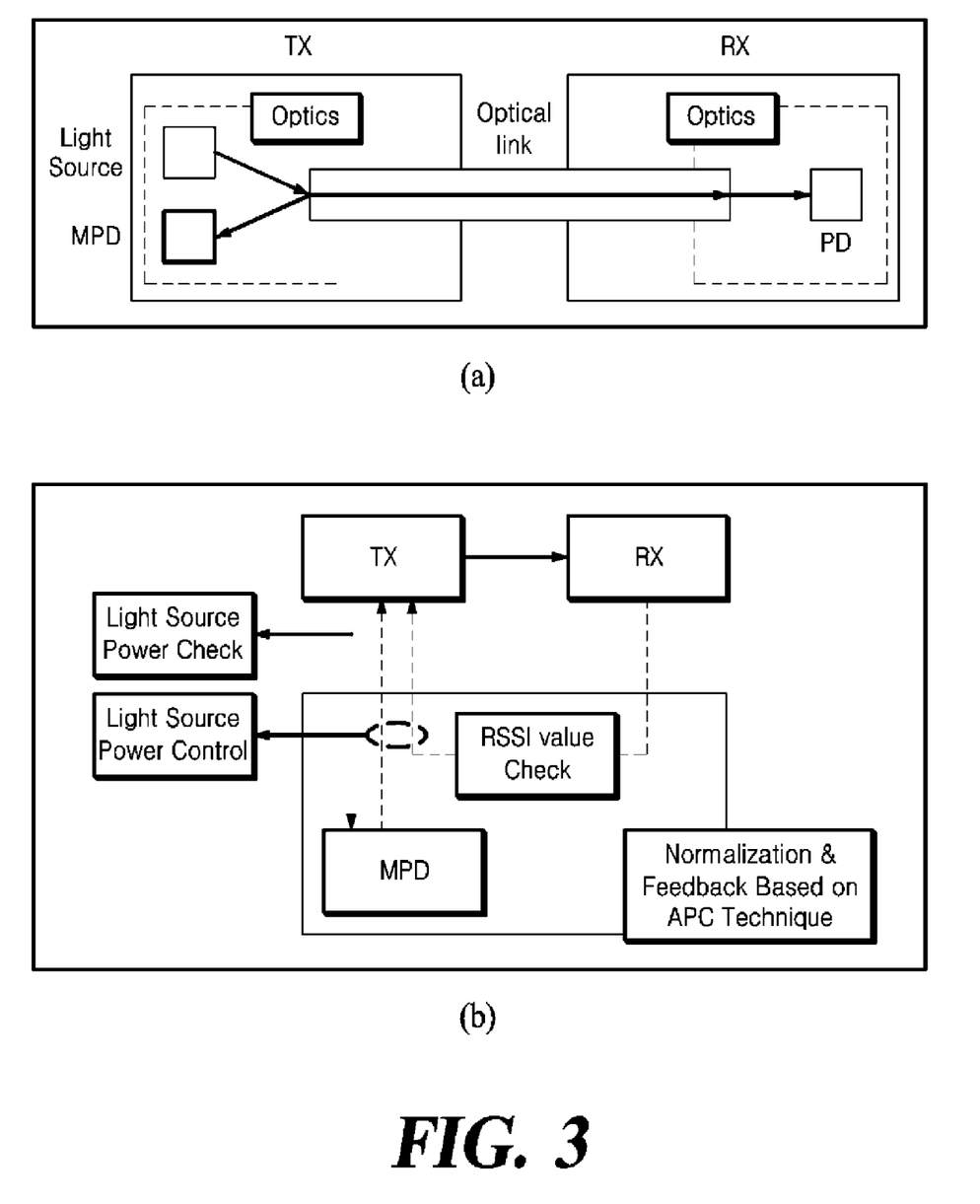
FIG. 3 is a diagram of a method performed by an optical transceiver for monitoring optical signals by using a monitoring photodetector (MPD).

FIG. 3 is a diagram of a method performed by an optical transceiver for monitoring optical signals by using a monitoring photodetector (MPD).

For convenience of description, FIG. 3 illustrates at (a) a one-way transceiver channel only. Specifically, a reception unit Rx is omitted from one module although it is supposed to be included in the same module along with a transmission unit Tx shown alone on the left side in FIG. 3 (a), and a transmission unit Tx is omitted from another module although it is supposed to be included in the another module along with a reception unit Rx shown alone on the right side.

As shown in FIG. 3 at (a), when using typical optical transceivers, the transmission unit Tx and the reception unit Rx are included in two separate optical transceivers or optical transceiver modules, respectively, while being interconnected by an optical link. Three components that form a single optical path, that is, the transmission unit Tx, the reception unit Rx and the optical link are typically sold as separate finished products and, in order to install and operate the same, proper optical transceivers and optical links need to be selected to enable smooth mutual optical transmission/reception between two optical transceivers.

Based on inherent characteristics of separate optical transceivers, characteristics of the optical signal transmitted by the transmission unit Tx may change before reaching the reception unit Rx. For instance, the temperature of a surrounding environment wherein the transmission unit Tx is provided may be different from that of another surrounding environment wherein the reception unit Rx is provided. Alternatively, the strength of the optical signals transmitted by the transmission unit Tx may be larger or smaller than that required in the reception unit Rx. In such case, in order that the transmission unit Tx can output larger optical signals, a greater current may be applied to an electrical-optical conversion device in the transmission unit Tx.

In order for a typical optical transceiver to correctly regulate the strength of optical signals outputted from the transmission unit Tx, an MPD is disposed in the transmission unit Tx. The transmission unit Tx of the typical optical transceiver may include optics provided with at least one light source and at least one MPD.

The optics refers to a part for generating, modulating and detecting optical signals. The light source and the MPD may be an electrical-optical conversion device and an optical-electrical conversion device optical-electrical conversion device, respectively. In general, the electrical-optical conversion device is driven by two parameters such as a bias current and a modulation current. The MPD included in the transmission unit Tx receives a part of optical signals outputted from the light source and serves to determine the strength of optical signals transmitted by the light source through the received signal portion.

In general, in order to receive a part of optical signals outputted from the light source, a further alternative optical system, for example, an optical splitter, an optical isolator, etc. should be additionally provided.

When an edge-emitting type laser is used as the light source, a part of the optical signals is outputted from one side of the edge-emitting type laser while the rest of the optical signals is outputted from the other side of the edge-emitting type laser. The MPD may be disposed on the other side rather than the one side used for output, and therefore, may receive and monitor the optical signals emitted in a direction on which the MPD is located, thereby determining the strength of the optical signals outputted in the other direction used for output.

With the optical transceiver shown in FIG. 3 at (a), the strength of optical signals outputted from the transmission unit Tx may be controlled according to a method illustrated in FIG. 3 at (b). Conventional optical signal control performed by the optical transceiver includes: normalization of a correlation between the strength of optical signals outputted from the transmission unit Tx and the strength of electrical signals outputted from the reception unit Rx after receiving the above optical signals and converting the same, for example, a correlation between the strength of the optical signals outputted from the transmission unit Tx and the strength of a current outputted from the reception unit Rx; and then, based on the normalization, regulating the strength of the optical signals outputted from the transmission unit Tx or feedbacking to enable the same to maintain a desired value. In this regard, in order to regulate the strength of the optical signals outputted from the transmission unit Tx, the strength of optical signals measured in real time in the MPD is used. Such optical signal control refers to automatic power control (APC). Herein, a current value obtained from the optical signals that were outputted from the transmission unit Tx and then detected and converted by the reception unit Rx may be used as an indicator (Received Signal Strength Indicator: RSSI). In this regard, a photodetector (PD) serves to receive the optical signals outputted from the transmission unit Tx and then convert the same into a current.

Figure 4:
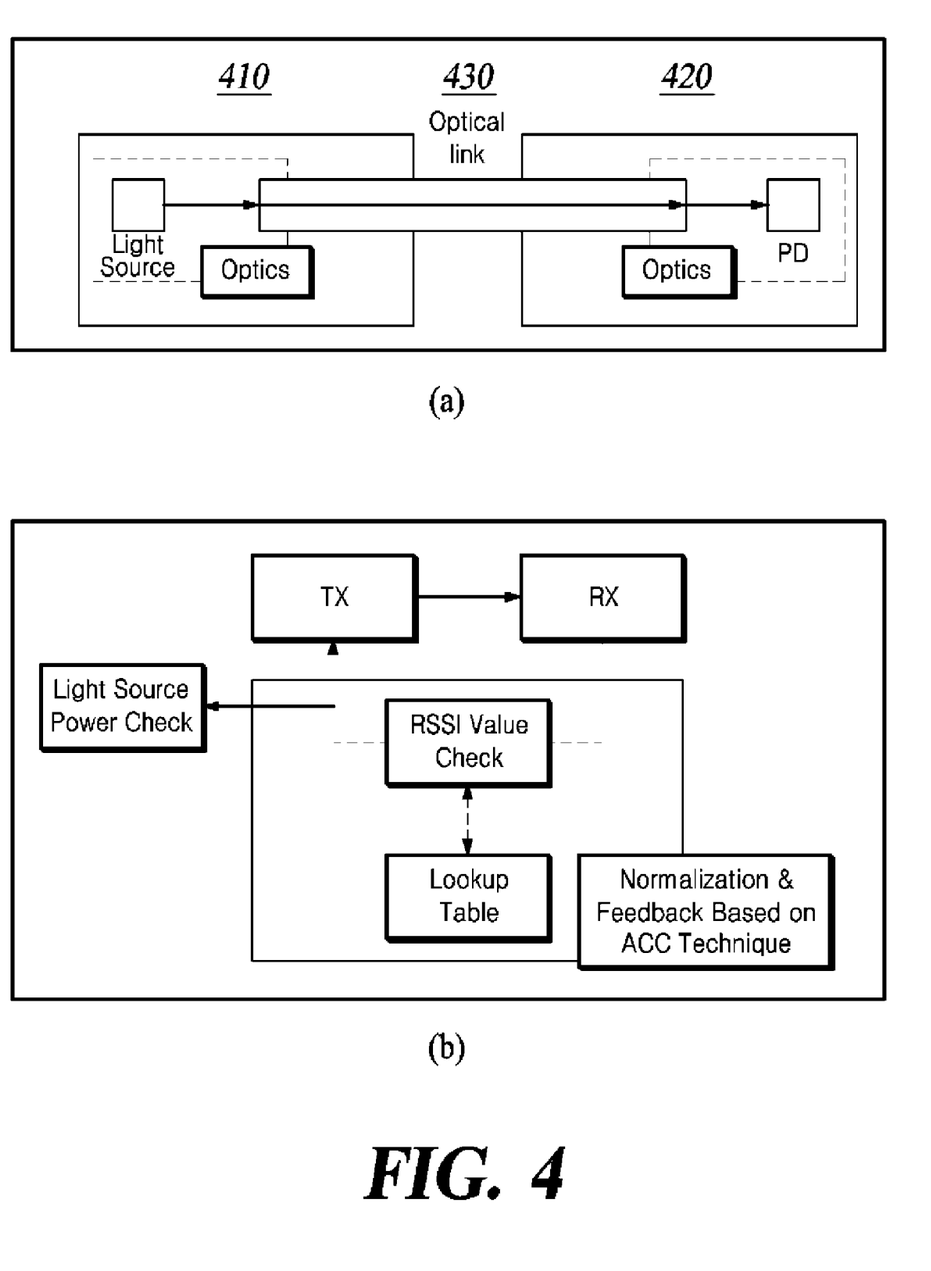
FIG. 4 is a diagram of an AOC provided with an electrical signal lookup table according to at least one embodiment of the present disclosure.

FIG. 4 is a diagram of an AOC provided with an electrical signal lookup table according to at least one embodiment of the present disclosure.

For convenience of description, FIG. 4 illustrates at (a) a one-way transmission-reception channel only. Specifically, a reception unit is omitted from one module although it is supposed to be included in the same module along with a transmission unit Tx shown alone on the left side in FIG. 4 (a), and a transmission unit is omitted from another module although it is supposed to be included in the another module along with a reception unit shown alone on the right side.

As shown in FIG. 4 at (a), the AOC 200 according to the embodiment of the present disclosure includes a first transmission-reception module 410, a second transmission-reception module 420 and an optical link 430. Each of the first transmission-reception module 410 and the second transmission-reception module 320 includes both of a transmission unit and a reception unit. However, for convenience of description, the first transmission-reception module 410 is illustrated by the transmission unit alone, and the second transmission-reception module 420 is illustrated by the reception unit alone.

For the AOC 200 shown in FIG. 4 at (a), the strength of optical signals outputted from the transmission unit, that is, from the light source may be controlled according to a method illustrated in FIG. 4 at (b).

Optical signal control performed by the AOC 200 according to at least one embodiment of the present disclosure includes: performing normalization of a correlation between the strength of optical signals outputted from the transmission unit Tx and the strength of electrical signals outputted from the reception unit Rx after receiving the above optical signals and converting the same, for example, normalization of a current outputted from the reception unit Rx in response to the strength of the optical signals outputted from the transmission unit Tx; and then, based on the normalization, regulating the strength of the optical signals outputted from the transmission unit Tx or feedbacking to maintain the maintain a desired value of strength of the optical signals outputted from the transmission unit Tx.

In this regard, in order to regulate the strength of the optical signals outputted from the transmission unit Tx, the AOC 200 according to at least one embodiment of the present disclosure may use pre-stored electro-optical characteristics and temperature characteristics between the transmission unit Tx and the reception unit Rx. Herein, in order to control the strength of the optical signals outputted from the transmission unit Tx, the transmission unit Tx uses solely the strength of the electrical signals generated by optical-electrical conversion in the reception unit Rx. Further, when controlling the strength of the optical signals outputted from the transmission unit Tx, a correlation is used in regard to the pre-stored electro-optical characteristics and temperature characteristics between the transmission unit Tx and the reception unit Rx. Herein, the correlations in regard to electro-optical characteristics and temperature characteristics between the transmission unit Tx and the reception unit Rx are stored in a lookup or reference table form in the first transmission-reception module 410 which has the transmission unit Tx.

A value obtained by detecting the optical signals outputted from the transmission unit Tx and converting the same into a current in the reception unit Rx may be used as an index, that is, RSSI value, In this case, a photodetector serves to receive the optical signals outputted from the transmission and convert the same into a current.

In this regard, the optical signal control shown in FIG. 4 at (a) an (b) is applicable to not only the AOC but also to a conventional optical transceiver or an optical link-coupled type optical transceiver that is configured by coupling an optical link to a single optical transceiver.

Figure 5:
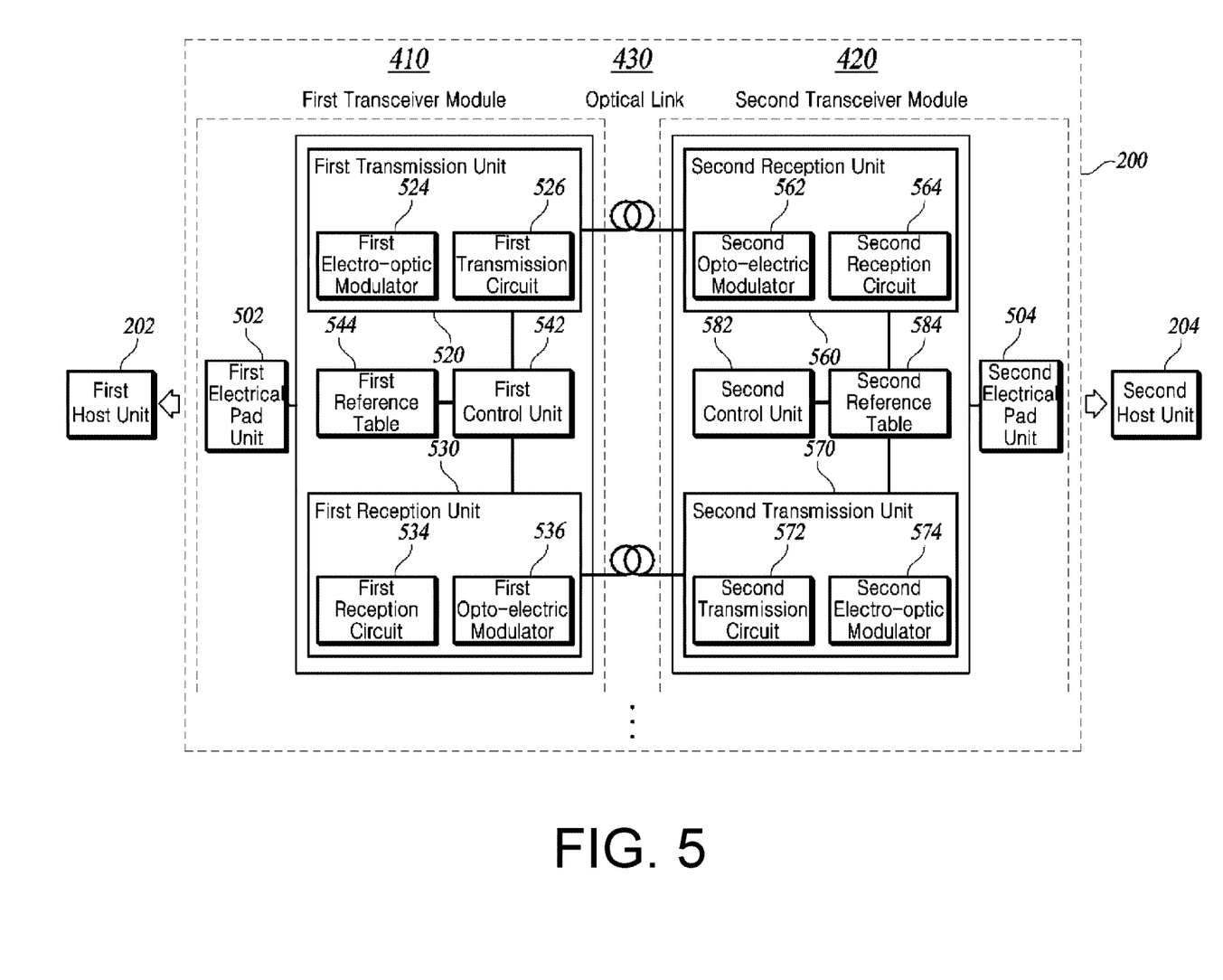
FIG. 5 is a schematic configuration diagram for explaining functions of an AOC according to at least one embodiment of the present disclosure.

FIG. 5 is a schematic configuration diagram for explaining functions of the AOC according to at least one embodiment of the present disclosure.

The AOC 200 according to at least one embodiment includes a first transceiver module 410, a second transceiver module 420 and an optical link 430. The AOC 200 shown in FIG. 5 is an illustrative example of the AOC including an optical link having one channel, and may also be applied to an AOC including at least one or more channels. For instance, in case of an AOC with a SFP, QSFP or OSFP structure, this AOC may be embodied as an optical link having 1, 4 or 8 transceiver channels, respectively. In this regard, if it is assumed that each transceiver channel can transmit one-way optical signals, the AOC with an SFP, QSFP or OSFP structure may be configured to have 2, 8 or 16 channels, respectively. Herein, each channel may be configured in an optical waveguide form containing optical fibers.

The optical signals are transferred between the first transmission-reception module 410 and the second transmission-reception module 420 by the medium of the optical link 430, and optical interconnection between an electrical-optical conversion device, an optical-electrical conversion device and the optical link 430 is established by using an integrated optical assembly including a lens and a reflector.

The first transmission-reception module 410 includes a first transmission unit 520, a first reception unit 530, a first control unit 542, a first reference table 544 and a first electrical pad unit 502.

The first transmission-reception module 410 may convert a first electrical signal inputted from a first external host unit 202 to a first optical signal and then transmit the first optical signal from a first end of the optical link 430 to a second end thereof which is in opposite to the first end and is connected to a second transmission-reception module 420. In this case, the first end is one end of the optical link 430 seamlessly connected with the first transmission-reception module 410 in the optical link 430 in physical and optical aspects. On the other hand, the second end is the other end of the optical link 430 seamlessly connected with the second transmission-reception module 420 in the optical link 430 in physical and optical aspects. Herein, the first host unit 202 is one of network devices functioning as server, switch and storage, as illustrated in FIG. 2.

The first transmission unit 520 may include at least one first electrical-optical conversion device 524 and a first transmission circuit 526 for driving the same. The first electrical-optical conversion device 524 is a device for converting an electrical signal to an optical signal and, preferably, a semiconductor laser such as distributed feedback (DFB) laser, vertical-cavity surface-emitting laser (VCSEL), distributed bragg reflector (DBR) laser, etc. The first transmission circuit 526 serves to receive an input of electrical signals and driving the first electrical-optical conversion device 524. The first transmission circuit 526 may increase or decrease the strength of the electrical signals applied to the first electrical-optical conversion device 524, on the basis of the electrical signals inputted from the outside, and it may re-adjust a timing of the electrical signals applied to the first electrical-optical conversion device 524. In other words, the first transmission circuit 526 may adjust the strength or timing of current inputted to the first electrical-optical conversion device 524 according to preset conditions or by control operation, so as to modify characteristics of optical signals outputted from the first electrical-optical conversion device 524. In this case, a function of adjusting the strength or timing of current may be embodied by separate components.

In this regard, the first transmission circuit 526 may drive the first electrical-optical conversion device 524, on the basis of the electrical signals inputted from the first host unit 202 through the first electrical pad unit 502 and the electrical signals inputted from the first control unit 542.

Further, the first transmission unit 520 converts the first electrical signal to the first optical signal and transmits the first optical signal to the second transmission-reception module 420 through the first end of the optical link 430. The first transmission unit 520 may use information pre-stored in the first reference table 544 to search a first linear section in which the first output current value linearly changes in response to the first input current value, and to set up the first input current value to an average or a median value of the first linear section.

Further, the first transmission unit 520 may use the information pre-stored in the first reference table 544 to divide the section, wherein a change in the first output current value relative to a change in first input current values is observed, into multiple sub-sections and may set the first input current value to change within each of the sub-sections.

The first transmission unit 520 may further include a first temperature sensor for detecting a first temperature which is an internal temperature of the first transmission unit 520.

Separate components included in the first transmission unit 520 may be connected to a communication path for interconnecting software modules or hardware modules inside the first transmission-reception module 410 so that the components work cooperatively. Such components communicate one another by using one or more communication buses or signal lines.

Each of the components in the first transmission unit 520 shown in FIG. 5 represents a unit for processing at least one function or operation, and the components may be embodied by a software module, a hardware module or a combination of the software module and the hardware module.

The first reception unit 530 may include a first optical-electrical conversion device 536 and a first reception circuit 534. The first optical-electrical conversion device 536 converts a second optical signal, which is the optical signal received from the second transmission-reception module 420, to a second electrical signal. The first reception circuit 534 receives an input of the second electrical signal generated by the first optical-electrical conversion device 536 and then outputs the same to the first host unit 202 through the first electrical pad unit 502. The first reception circuit 534 may increase or decrease the strength of electrical signals outputted to the first host unit 202 in accordance with preset conditions or by control operation, and may further re-adjust the timing of electrical signals outputted.

In this regard, the first reception circuit 534 may control the electrical signals output to the first electrical pad unit 502 on the basis of the electrical signals input from the first optical-electrical conversion device 536 and the electrical signals input from the first control unit 542.

Further, on the basis of PAM-N technique including PAM-4, PAM-8 and PAM-16 which uses at least 2 bit logic information value per unit clock pulse, the first transmission circuit 526 may drive the first electrical-optical conversion device 524 while the first reception circuit 534 may process the electrical signals generated by the first optical-electrical conversion device 536.

The first control unit 542 is electrically connected with the first transmission circuit 526, the first reception circuit 534 and the first electrical pad unit 502 to thus control the first transmission circuit 526 or the first reception circuit 534. The first control unit 542 may control the first transmission circuit 526 or the first reception circuit 534, on the basis of the preset condition or the electrical signals inputted from the first host unit 202 via the first electrical pad unit 502. Further, the first control unit 542 may control the first transmission circuit 526 or the first reception circuit 534 based on the information pre-stored in the first reference table 544.

Optical signals outputted from the first transmission unit 520 in the first transmission-reception module 410 and then inputted to the second reception unit 560 in the second transmission-reception module 420 may be controlled by using a correlation between the strength of the optical signals outputted from the first transmission unit 520 and the strength of electrical signals outputted from the second reception unit 560 that receives the above optical signals and converts the same to generate the electrical signals. In other words, after normalization of the strength of current outputted from the second reception unit 560 in response to the strength of optical signals outputted from the first transmission unit 520, the strength of optical signals outputted from the first transmission unit 520 may be regulated or feedback to maintain a desired value, based on the normalization result.

In order to regulate the strength of optical signals outputted from the first transmission unit 520, the AOC 200 according to at least one embodiment of the present disclosure may use pre-stored electro-optical characteristics and temperature characteristics of the first transmission unit 520 and the second reception units 560. Herein, in order to control the strength of optical signals outputted from the first transmission unit 520, the first transmission unit 520 uses only the strength of electrical signals generated through optical-electrical conversion in the second reception unit 560. When controlling the strength of optical signals outputted from the first transmission unit 520, the first transmission unit 520 uses a specific correlation between the first transmission unit 520 and the second reception unit 560 in regard to the pre-stored electro-optical characteristics and temperature characteristics. In this case, the correlation between the first transmission unit 520 and the second reception unit 560 in regard to the pre-stored electro-optical characteristics and temperature characteristics is stored in a lookup table form in the first transmission-reception module 410 that includes the first transmission unit 520. Herein, the lookup table may include the first reference table 544, and the first reference table 544 may be stored in a non-volatile memory included in the first transmission-reception module 410.

The first control unit 542 may control the strength of the first optical signal using a current value in response to the electro-optical characteristics and temperature of the second reception unit 560 from among information stored in the first reference table 544.

Further, when the current temperature is within a reference temperature range, the first control unit 542 may control the first transmission circuit 526 to apply a current corresponding to a first input current compensation value to the first electrical-optical conversion device 524, thereby compensating for a deviation equal to a first reference optical output value when the strength of the first optical signal outputted from the first electrical-optical conversion device 524 corresponds to a first input current value.

Further, when the current temperature is out of the reference temperature range, the first control unit 520 may control the first transmission circuit 526 to apply a current corresponding to a first temperature-dependent compensation current value to the first electrical-optical conversion device 524, thereby compensating for a temperature-dependent deviation equal to the first reference optical output value when the strength of the first optical signal output from the first electrical-optical conversion device 524 corresponds to the first input current value.

The first reference table 544 stores a compensation current value in accordance with the electro-optical characteristics and temperature of the second reception unit 560. The first reference table 544 may store the first input current value which is a bias current value inputted to at least one first electrical-optical conversion device 524. The first reference table 544 may store the first output current value, which is outputted from the second reception unit 560 in response to the first input current value.

The first reference table 544 may store the first input current compensation value to compensate for the first output current value if the first output current value is different from a preset first reference value. The first reference table 544 may further store the first input current value, the first output current value and the first input current compensation value, in connection with a change in first temperatures sensed by the first transmission unit 520.

Herein, the first input current value may be a value determined in consideration of both of a bias current value and a modulation current value.

The second transmission-reception module 420 includes a second transmission unit 570, the second reception unit 560, a second control unit 582, a second reference table 584 and a second electrical pad unit 504.

The second transmission-reception module 420 converts a third electrical signal inputted from a second external host unit 204 to a third optical signal and transmits the third optical signal from the second end of the optical link 430 to the first end thereof, which is connected to the first transmission-reception module 410 in opposite to the above second end. In this case, the second end is one end of the optical link 430 seamlessly connected with the second transmission-reception module 420 in the optical link 430 in physical and optical aspects. Herein, the second host unit 204 is one of network devices functioning as server, switch and storage, as illustrated in FIG. 2.

The second transmission unit 570 may include at least one second electrical-optical conversion device 574 and a second transmission circuit 572 to drive the same. The second electrical-optical conversion device 574 is a device of converting an electrical signal to an optical signal and, preferably, a semiconductor laser such as DFB laser, VCSEL, DBR laser, etc. The second transmission circuit 572 serves to receive an input of electrical signals and driving the second electrical-optical conversion device 574. The second transmission circuit 572 may increase or decrease the strength of the electrical signals applied to the second electrical-optical conversion device 574, on the basis of the electrical signals inputted from the outside, in addition, may re-adjust a timing of the electrical signals applied to the second electrical-optical conversion device 574. In other words, the second transmission circuit 572 may adjust the strength or timing of current inputted to the second electro-optical modulator 524 according to preset conditions or by control operation, so as to modify characteristics of optical signals outputted from the second electrical-optical conversion device 574. In this case, a function of adjusting the strength or timing of current may be embodied by separate components.

In this regard, the second transmission circuit 572 may drive the second electrical-optical conversion device 574, on the basis of the electrical signals inputted from the second host unit 204 through the second electrical pad unit 504 and the electrical signals inputted from the second control unit 582.

Further, the second transmission unit 570 converts the third electrical signal to the third optical signal and transmits the third optical signal to the first transmission-reception module 410 through the second end of the optical link 430. The second transmission unit 570 may use information pre-stored in the second reference table 584 to search a second linear section in which the second output current value linearly changes in response to the second input current value changes, and to set up the second input current value to an average or a median value of the second linear section.

Further, the second transmission unit 570 may use the information pre-stored in the second reference table 584 to divide the section, wherein a change in the second output current value relative to a change in he second input current values is observed, into multiple sub-sections and may set the second input current value to change within each of the sub-sections.

The second transmission unit 570 may further include a second temperature sensor for detecting a second temperature which is an internal temperature of the second transmission unit 570.

Separate components included in the second transmission unit 570 may be connected to a communication path for interconnecting software modules or hardware modules inside the second transmission-reception module 420 so that the components work cooperatively. Such components communicate one another by using one or more communication buses or signal lines.

Each of the components in the second transmission unit 570 shown in FIG. 5 represents a unit for processing at least one function or operation, and the components may be embodied by a software module, a hardware module or a combination of the software module and the hardware module.

The second reception unit 560 may include a second optical-electrical conversion device 562 and a second reception circuit 564. The second optical-electrical conversion device 562 converts a fourth optical signal, which is the optical signal received from the first transmission-reception module 410, to a fourth electrical signal. The second reception circuit 564 receives an input of the fourth electrical signal generated by the second optical-electrical conversion device 562 through opto-electric modulation and then outputs the same to the second host unit 204 through the second electrical pad unit 504. The second reception circuit 564 may increase or decrease the strength of electrical signals outputted to the second host unit 204 in accordance with preset conditions or by control operation, and may further re-adjust the timing of electrical signals outputted.

In this regard, the second reception circuit 564 may control the electrical signals output to the second electrical pad unit 504 on the basis of the electrical signals input from the second optical-electrical conversion device 562 and the electrical signals input from the second control unit 582.

Further, on the basis of PAM-N technique including PAM-4, PAM-8 and PAM-16 which uses at least 2 bit logic information value per unit clock pulse, the second transmission circuit 572 may drive the second electrical-optical conversion device 574 while the second reception circuit 564 may process the electrical signals generated by the second optical-electrical conversion device 562.

The second control unit 582 is electrically connected with the second transmission circuit 572, the second reception circuit 564 and the second electrical pad unit 504 to thus control the second transmission circuit 572 or the second reception circuit 564. The second control unit 582 may control the second transmission circuit 572 or the second reception circuit 564, on the basis of the preset condition or the electrical signals inputted from the second host unit 204 via the second electrical pad unit 504. Further, the second control unit 582 may control the second transmission circuit 572 or the second reception circuit 564 based on the information pre-stored in the second reference table 584.

Optical signals outputted from the second transmission unit 570 in the second transmission-reception module 420 and then inputted to the first reception unit 530 in the first transmission-reception module 410 may be controlled by using a correlation between the strength of the optical signals outputted from the second transmission unit 570 and the strength of electrical signals outputted from the first reception unit 530 that receives the above optical signals and converts the same to generate the electrical signals. In other words, after normalization of current outputted from the first reception unit 530 in response to the strength of optical signals outputted from the second transmission unit 570, the strength of optical signals outputted from the second transmission unit 570 may be regulated or feedback to maintain a desired value, based on the normalization result.

In order to regulate the strength of optical signals outputted from the second transmission unit 570, the AOC 200 according to at least one embodiment of the present disclosure may use pre-stored electro-optical characteristics and temperature characteristics of the second transmission unit 570 and the first reception units 530. Herein, in order to control the strength of optical signals outputted from the second transmission unit 570, the second transmission unit 570 uses only the strength of electrical signals generated through optical-electrical conversion in the first reception unit 530. When controlling the strength of optical signals outputted from the second transmission unit 570, the second transmission unit 570 uses a correlation between the second transmission unit 570 and the first reception unit 530 in regard to the pre-stored electro-optical characteristics and temperature characteristics. In this case, the correlation between the second transmission unit 570 and the first reception unit 530 in regard to the pre-stored electro-optical characteristics and temperature characteristics is stored in a lookup table form in the second transmission-reception module 420 that includes the second transmission unit 570. Herein, the lookup table may include the second reference table 584, and the second reference table 584 may be stored in a non-volatile memory included in the second transmission-reception module 420.

The second control unit 582 may control the strength of the third optical signal using a current value in response to the electro-optical characteristics and temperature of the first reception unit 530 from among information stored in the first reference table 584.

Further, when the current temperature is within a reference temperature range, the second control unit 582 may control the second transmission circuit 572 to apply a current corresponding to a second input current compensation value to the second electrical-optical conversion device 574, thereby compensating for a deviation equal to a second reference optical output value when the strength of the third optical signal outputted from the second electrical-optical conversion device 574 corresponds to a second input current value.

Further, when the current temperature is out of the reference temperature range, the second control unit 582 may control the second transmission circuit 572 to apply a current corresponding to a second temperature-dependent compensation current value to the second electrical-optical conversion device 574, thereby compensating for a temperature-dependent deviation equal to the second reference optical output value when the strength of the third optical signal output from the second electrical-optical conversion device 574 corresponds to the second input current value.

The second reference table 584 stores a compensation current value in accordance with the electro-optical characteristics and temperature of the first reception unit 530. The second reference table 584 may store the second input current value which is a bias current value inputted to at least one second electrical-optical conversion device 574. The second reference table 584 may store the second output current value, which is outputted from the first reception unit 530 in response to the second input current value.

The second reference table 584 may store the second input current compensation value to compensate for the second output current value if the second output current value is different from a preset second reference value. The second reference table 584 may further store the second input current value, the second output current value and the second input current compensation value, in connection with a change in second temperature sensed by the second transmission unit 570.

Herein, the second input current value may be a value determined in consideration of both of a bias current value and a modulation current value.

The optical link 430 may include at least one optical fiber. One end of the optical fiber included in the optical link 430 is connected to an output end of the first transmission unit 520. The other end of at least one optical fiber is connected to an input end of the second reception unit 560. Further, one end of at least another optical fiber is connected to an output end of the second transmission unit 570. Further, the other end of at least another optical fiber is connected to an input end of the first reception unit 530.

At least one of the first optical signal, the second optical signal, the third optical signal and the fourth optical signal is an optical signal generated on the basis of PAM-N technique which uses at least 2 bit logic information value per unit clock pulse. The PAM-N technique includes PAM-4, PAM-8 and PAM-16.

At least one of the first transmission-reception module 410 and the second transmission-reception module 420 may include at least one of a retimer and an equalizer.

Figure 6:
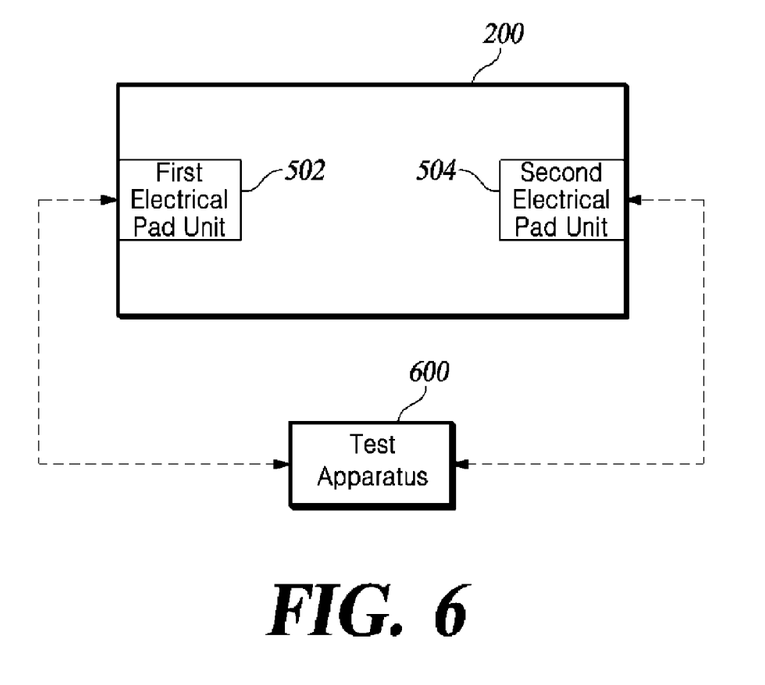
FIG. 6 is a diagram of a method of storing information in a lookup table by connecting an AOC according to at least one embodiment of the present disclosure to a test apparatus.

FIG. 6 is a diagram of a method of storing information in a lookup table by connecting an AOC according to at least one embodiment of the present disclosure to a test apparatus.

As shown in FIG. 6, the AOC 200 with low power consumption, operating over a wide temperature range is connected to the test apparatus 600 by using the first electrical pad unit 502 and the second electrical pad unit 504. The low-power-consumption AOC 200 may be provided with the first reference table 544 and the second reference table 584 in which a value preset by the test apparatus 600 is stored.

The test apparatus 600 is connected with the first electrical pad unit 502 and the second electrical pad unit 504, in order to set values stored in the first reference table 544 and the second reference table 584, before shipping the finished products.

Figure 7:
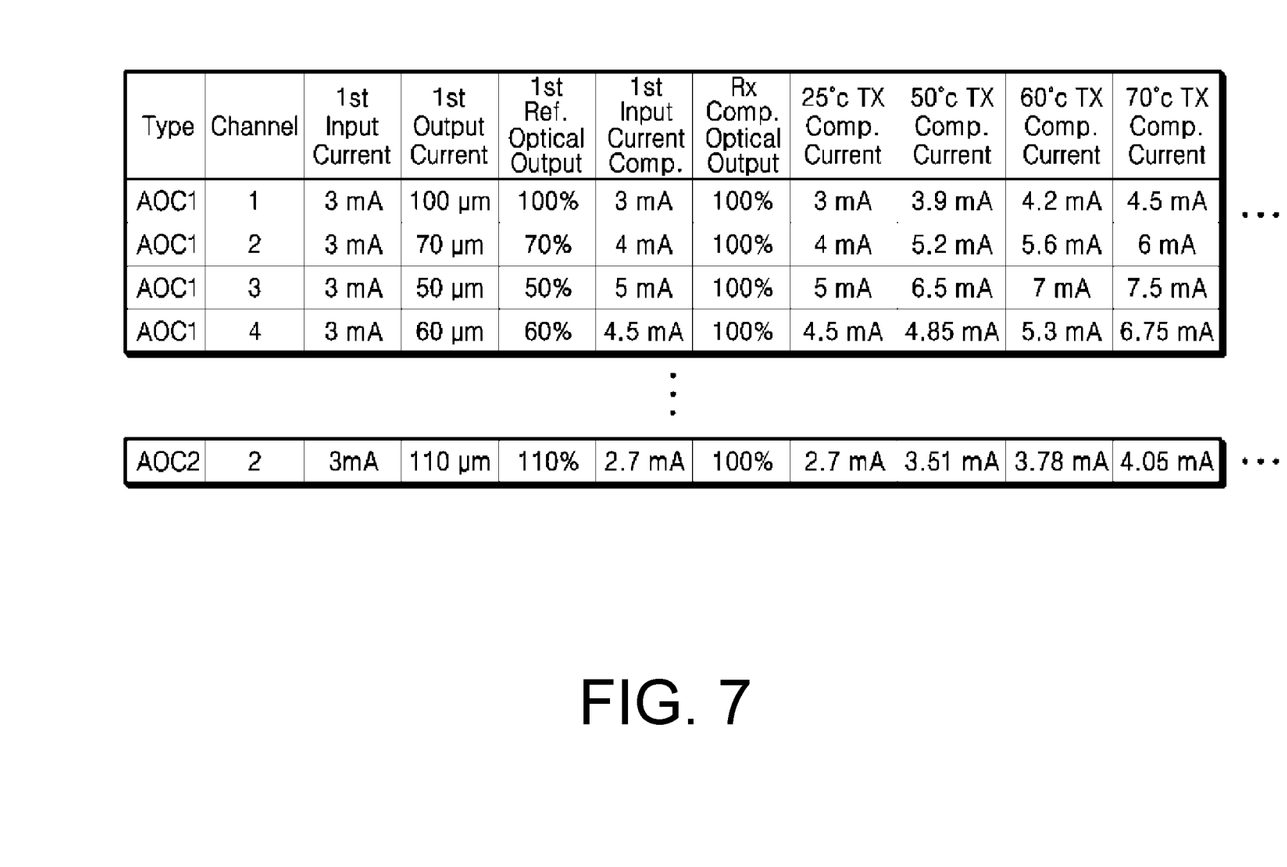
FIG. 7 is a diagram of an electrical signal lookup table according to at least one embodiment of the present disclosure.

FIG. 7 is a diagram of an electrical signal reference table according to at least one embodiment of the present disclosure.

The first reference table 544 stores a first input current value (i.e., 3 mA) applied to the first transmission unit 520. The first reference table 544 may store a first output current value (i.e., 100 µA, 70 µA, 50 µA, 60 µA) outputted from the second reception unit 560 in response to the first input current value. The first reference table 544 stores a first input current compensation value (i.e., 3 mA, 4 mA, 5 mA, 4.5 mA) to compensate for a deviation due to optical characteristics, which is equal to a first reference optical output value in response to the first input current value. The first reference table 544 may store a first temperature-dependent compensation current value (i.e., a compensation current value at 25° C. such as 3 mA, 4 mA, 5 mA, 4.5 mA; a compensation current value at 50° C. such as 3.9 mA, 5.2 mA, 6.5 mA, 4.85 mA; a compensation current value at 60° C. such as 4.2 mA, 5.6 mA, 7 mA, 5.3 mA; a compensation current value at 70° C. such as 4.5 mA, 6 mA, 7.5 mA, 6.75 mA) to compensate for a temperature-dependent deviation which is equal to the first reference optical output value in response to the first input current value.

The second reference table 584 stores a second reference current value (i.e., 3 mA) applied to the second transmission unit 570. The second reference table 584 stores a second output current value (i.e., 100 µA, 70 µA, 50 µA, 60 µA) outputted from the first reception unit 530 in response to the second reference current value. The second reference table 584 stores a second input current compensation value (i.e., 3 mA, 4 mA, 5 mA, 4.5 mA) to compensate for a deviation due to optical characteristics, which is equal to a first reference optical output value corresponding to the second reference current value. The second reference table 584 stores a second temperature-dependent compensation current value (i.e., a compensation current value at 25° C. such as 3 mA, 4 mA, 5 mA, 4.5 mA; a a compensation current value at 50° C. such as 3.9 mA, 5.2 mA, 6.5 mA, 4.85 mA; a compensation current value at 60° C. such as 4.2 mA, 5.6 mA, 7 mA, 5.3 mA; a compensation current value at 70° C. such as 4.5 mA, 6 mA, 7.5 mA, 6.75 mA) to compensate for a temperature-dependent deviation which is equal to the first reference optical output value corresponding to the reference current value.

The AOC 200 according to at least one embodiment of the present disclosure ultimately detects in real time how the strength of optical signals output from a light source in a transmission unit (the first transmission unit 520, the second transmission unit 570) is varied, and then, prepare a lookup table form (the first reference table 544, the second reference table 584) and include this lookup table (the first reference table 544, the second reference table 584) in the transmission unit (the first transmission unit 520, the second transmission unit 570).

The transmission unit (the first transmission unit 520, the second transmission unit 570) in the AOC 200 may be provided with a simple micro-controller unit (MCU) (the first control unit 542, the second control unit 582).

A memory provided inside or outside the MCU (the first control unit 552, the second control unit 582) may include the lookup table (the first reference table 544, the second reference table 584). The MCU (the first control unit 542, the second control unit 582) drives the light source in the transmission unit (the first transmission unit 520, the second transmission unit 570) while controlling the current value based on the information stored in this lookup table (the first reference table 544, the second reference table 584).

In order to compensate for a change in temperature, a temperature sensor is included in the transmission-reception module. For instance, the strength of optical signals outputted from the light source in the transmission unit (the first transmission unit 520, the second transmission unit 570) is 100% at 25° C. When the temperature of the transmission unit (the first transmission unit 520, the second transmission unit 570) is 70° C., the strength of optical signals outputted from the light source is decreased by 50%, compared to the same at 25° C. In this case, where the transmission unit (the first transmission unit 520, the second transmission unit 570) already has the aforementioned information, it is informed of the amount of current that needs to be further applied to the light source in order to increase the 50% decreased size of optical signals outputted at 70° C. up to 100%, that is, it can determine the compensation current value. Therefore, the compensation current value is pre-stored in the lookup table (the first reference table 544, the second reference table 584).

The AOC 200 capable of operating over a broad temperature range according to at least one embodiment of the present disclosure can control all numbers of transmission units embodied as an optical link including a plurality of channels, on the basis of the aforementioned method.

Figure 8:
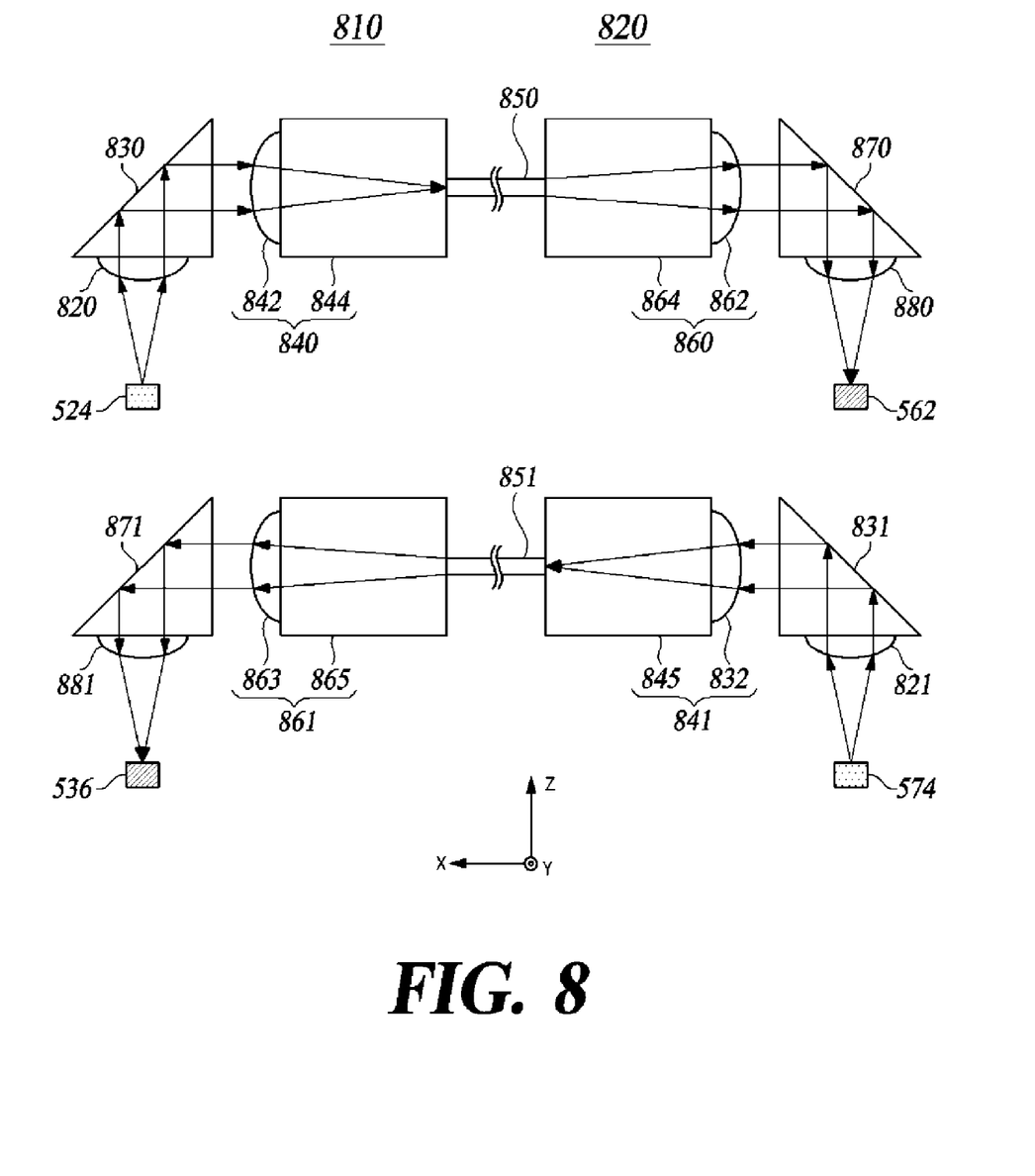
FIG. 8 is a diagram for illustrating a concept of an optical system included in an optical transceiver module according to at least one embodiment of the present disclosure.

FIG. 8 is a diagram for illustrating a concept of an optical system included in an optical transceiver assembly according to at least one embodiment of the present disclosure.

The first transmission-reception module 410 according to the embodiment of the present disclosure may include a first optical assembly 810.

The first optical assembly 810 is an assembly for optical transmission/reception, and includes a first electrical-optical conversion device 524 for transmitting optical signals, a first collimator lens 820, a first reflector 830 and a first transmitter focusing lens unit 840. Herein, the first transmitter focusing lens unit 840 may include a first focusing lens 842 and a first spacer 844.

The first collimator lens 820 shapes diverging light emitted from the first electrical-optical conversion device 524 to form a first parallel beam. The first collimator lens 820 transfers the first parallel beam to the first reflector 830. Herein, a set of light rays is called the 'beam'.

The first reflector 830 alters the direction of the first parallel beam by a preset angle to form a second parallel beam. The first reflector 830 reflects and sends a second parallel beam to the first focusing lens 842 wherein the second parallel beam is formed by altering a path of the parallel beam from the first collimator lens 820 by an angle of 90°.

The first focusing lens 842 focuses the second parallel beam and cause a focused second parallel beam to be incident on a first end positioned at a preset distance.

An x-directional thickness of the first spacer 844 corresponds to a distance as much as a focal length of the first focusing lens 842. Light rays passing through the first focusing lens 842 may be focused in a core of the optical fiber 850 by forming the first spacer 844 to have the x-directional thickness identical to the focal length of the first focusing lens 842.

When the first optical assembly 810 according to at least one embodiment is applied to an optical receiver, the roles of the collimator lens and the focusing lens are reversed in terms of function to those of lenses employed in an optical transmitter. Hereinafter, a component including different functional elements will be defined as an assembly.

The first optical assembly 810 is an assembly for optical transmission/reception, and includes a first optical-electrical conversion device 536 for receiving optical signals, a fourth focusing lens 881, a fourth reflector 871 and a first receiver focusing lens unit 861. Herein, the first receiver focusing lens unit 861 includes a fourth collimator lens 863 and a fourth spacer 865.

At least one first electrical-optical conversion device 524 and at least one first optical-electrical conversion device 536 are optically coupled with at least one optical link 430 through the first optical assembly 810. The first optical signal is diverging light emitted from the at least one first electrical-optical conversion device 524.

The second transmission-reception module 420 according to at least one embodiment may be embodied in the form of a second optical assembly 820.

The second optical assembly 820 is an assembly for optical transmission/reception, and includes a second electrical-optical conversion device 574 for transmitting optical signals, a third collimator lens 821, a third reflector 831 and a second transmitter focusing lens unit 841. Herein, the second transmitter focusing lens unit 841 includes a third focusing lens 832 and a third spacer 845.

The third collimator lens 821 shapes diverging light emitted from at least one second electrical-optical conversion device 574 to form a third parallel beam. The third collimator lens 821 transfers the third parallel beam to the third reflector 831. Herein, a set of light rays is called the 'beam'.

The third reflector 831 alters the direction of the third parallel beam by a preset angle to form a fourth parallel beam. The third reflector 831 reflects and sends a fourth parallel beam to the third focusing lens 832 wherein the fourth parallel beam is formed by altering a path of the parallel beam from the third collimator lens 821 by an angle of 90°.

The third focusing lens 832 focuses the fourth parallel beam and causes the focused fourth parallel beam to be incident on a second end positioned at a preset distance. The third optical signal is diverging light emitted from at least one second electrical-optical conversion device 574.

An x-directional thickness of the third spacer 845 corresponds to a distance as much as a focal length of the first focusing lens 842. Light rays passing through the third focusing lens 832 may be focused in a core of the optical fiber 851 by forming the third spacer 844 to have the x-directional thickness identical to the focal length of the third focusing lens 832.

When the second optical assembly 820 according to at least one embodiment is applied to an optical receiver, the roles of the collimator lens and the focusing lens are reversed in terms of function to those of lenses employed in an optical transmitter. Hereinafter, a component including different functional elements will be defined as an assembly.

The second optical assembly 820 is an assembly for optical transmission/reception, and includes a second optical-electrical conversion device 562 for receiving optical signals, a second focusing lens 880, a second reflector 870 and a second receiver focusing lens unit 860. Herein, the second receiver focusing lens unit 860 includes a second collimator lens 862 and a second spacer 864.

At least one second electrical-optical conversion device 574 and at least one second optical-electrical conversion device 562 are optically coupled with at least one optical link 430 through the second optical assembly 820.

Although exemplary embodiments of the present disclosure have been described for illustrative purposes, those skilled in the art will appreciate that various modifications, additions and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

The invention claimed is:

1. An active optical cable, comprising:
   an optical link configured to include a first end and a second end, and to transfer optical signals between the first end and the second end bilaterally;
   a first transmission-reception module configured to either convert a first electrical signal inputted from a first host unit to a first optical signal and then transmit the first optical signal from the first end to the second end, or convert a second optical signal received from the second end to a second electrical signal and then output the second electrical signal to the first host unit, and to concurrently control a strength of the first optical signal in accordance with electro-optical characteristics and a temperature which are stored in advance; and
   a second transmission-reception module configured to either convert a third electrical signal inputted from a second host unit to a third optical signal and then transmit the third optical signal from the second end to the first end, or convert a fourth optical signal received from the second end to a fourth electrical signal and then output the fourth electrical signal to the second host unit, and to concurrently control a strength of the third optical signal in accordance with electro-optical characteristics and a temperature which are stored in advance,
   wherein the first transmission-reception module comprises:
      a first electrical pad unit configured to receive the first electrical signal from the first host unit or to transmit the second electrical signal to the first host unit,
      a first transmission unit having a first electrical-optical conversion device configured to convert the first electrical signal to the first optical signal and a first transmission circuit configured to drive the first electrical-optical conversion device, and
      a first reception unit having a first optical-electrical conversion device configured to convert the second optical signal to the second electrical signal and a first reception circuit configured to drive the first optical-electrical conversion device; and
   wherein the second transmission-reception module comprises:
      a second electrical pad unit configured to receive the third electrical signal from the second host unit or to transmit the fourth electrical signal to the second host unit,
      a second transmission unit having a second electrical-optical conversion device configured to convert the third electrical signal to the third optical signal and a second transmission circuit configured to drive the second electrical-optical conversion device, and
      a second reception unit having a second optical-electrical conversion device configured to convert the fourth optical signal to the fourth electrical signal and a second reception circuit configured to drive the second optical-electrical conversion device,
   wherein the first transmission unit comprises:
      a first reference table configured to store a compensation current value in accordance with the electro-optical characteristics and the temperature of the second reception unit, and
      a first control unit configured to control a strength of the first optical signal by using current value corresponding to the electro-optical characteristics and the temperature of the second reception unit from among information pre-stored in the first reference table; and
   wherein the second transmission unit comprises:
      a second reference table configured to store a compensation current value in accordance with the electro-optical characteristics and the temperature of the first reception unit, and
      a second control unit configured to control a strength of the third optical signal by using a current value corresponding to the electro-optical characteristics and the temperature of the first reception unit from among information pre-stored in the second reference table.

2. The active optical cable of claim 1, wherein
the first reference table is configured to store:
   a first input current value which is a bias current value inputted to the first electrical-optical conversion device,
   a first output current value which is outputted from the second reception unit in response to the first input current value, and
   a first input current compensation value for compensating for the first output current value when the first output current value is different from a preset first reference value, and
wherein the second reference table is configured to store:
   a second input current value which is a bias current value inputted to the second electrical-optical conversion device,
   a second output current value which is outputted from the first reception unit in response to the second input current value, and
   a second input current compensation value for compensating for the second output current value when the second output current value is different from a preset second reference value.

3. The active optical cable of claim 2, wherein
the first transmission unit is configured to further include a first temperature sensor for sensing a first temperature representing an internal temperature of the first transmission unit, and to further store in the first reference table the first input current value, the first output current value and the first input current compensation value, as varied, in response to a change in the first temperature; and wherein the second transmission unit is configured to further include a second temperature sensor for sensing a second temperature representing an internal temperature of the second transmission unit, and to further store in the second reference table the second input current value, the second output current value and the second input current compensation value, as varied, in response to a change in the second temperature.

4. The active optical cable of claim 3, wherein the first transmission unit is configured to use the information pre-stored in the first reference table to search a first linear section in which the first output current value linearly changes in response to the first input current value, and to set up the first input current value to an average or a median value of the first linear section, and wherein the second transmission unit is configured to use the information pre-stored in the second reference table to search a second linear section in which the second output current value linearly changes in response to the second input current value changes, and to set the second input current value to an average or a median value of the second linear section.

5. The active optical cable of claim 1, wherein at least one of the first optical signal, the second optical signal, the third optical signal and the fourth optical signal is an optical signal generated on the basis of a multi-level pulse amplitude modulation technique which uses at least 2 bit logic information value per unit clock pulse.

6. The active optical cable of claim 5, wherein the multi-level pulse amplitude modulation technique comprises PAM-4, PAM-8 and PAM-16.

7. The active optical cable of claim 1, wherein at least one or more of the first transmission-reception module and the second transmission-reception module includes at least one of a retimer and an equalizer.

8. The active optical cable of claim 1, wherein the optical link comprises at least one optical fiber having one end connected to the first transmission unit and the other end connected to the second reception unit.

9. The active optical cable of claim 8, wherein the first electrical-optical conversion device and the first optical-electrical conversion device are optically connected with at least one of the optical link through a first optical assembly, and wherein the second electrical-optical conversion device and the second optical-electrical conversion device are optically coupled with at least one of the optical link through a second optical assembly.

10. The active optical cable of claim 9, wherein the first optical assembly comprises, in an integrated structure:
a first collimator lens configured to shape diverging light emitted from the first electrical-optical conversion device to form a first parallel beam,
a first reflector configured to alter a direction of the first parallel beam by a preset angle to form a second parallel beam, and
a first focusing lens configured to focus the second parallel beam and cause a focused second parallel beam to be incident on the first end positioned at a preset distance; and wherein the second optical assembly comprises, in an integrated structure:
a third collimator lens configured to shape diverging light emitted from the second electrical-optical conversion device to form a third parallel beam,
a third reflector configured to alter a direction of the third parallel beam by a preset angle to form a fourth parallel beam, and
a third focusing lens configured to focus the fourth parallel beam and cause a focused fourth parallel beam to be incident on the second end positioned at a preset distance.

11. The active optical cable of claim 10, wherein the diverging light emitted from the first electrical-optical conversion device is the first optical signal, and the diverging light emitted from the second electrical-optical conversion device is the second optical signal.

* * * * *